United States Patent Office 3,832,353
Patented Aug. 27, 1974

3,832,353
2H-THIAPYRANS
Daniel Hainaut, Villemomble, Edmond Toromanoff, Paris, and Jean-Pierre Demoute, Montreuil-sous-Bois, France, assignors to Roussel-UCLAF, Paris, France
No Drawing. Filed July 25, 1972, Ser. No. 275,107
Claims priority, application France, July 27, 1971, 7127448
Int. Cl. C07d 65/08
U.S. Cl. 260—327 TH          2 Claims

ABSTRACT OF THE DISCLOSURE

Novel 2H-thiapyrans of the formula:

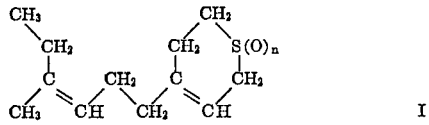

wherein $n$ is 0 or 1 and especially the Z isomers which have remarkable insecticidal properties and are intermediates in the synthesis of juvenile hormone and their preparation.

OBJECTS OF THE INVENTION

It is an object of the invention to provide the novel 2H-thiapyrans of formula I and particularly the Z isomers thereof.

It is another object of the invention to provide a novel process for the preparation of thiapyrans of formula I.

It is an additional object to provide novel insecticidal compositions.

These and other objects and advantages of the invention will become obvious from the following detailed description.

THE INVENTION

The novel 2H-thiapyrans of the invention have the formula:

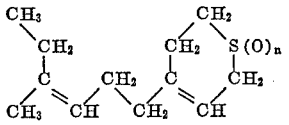

wherein $n$ is 0 or 1. Particularly preferred are the Z isomers.

The products of formula I possess remarkable insecticidal properties. They are especially active on larvae and pupae, but act equally in a very efficacious manner on any stage of insect development. When a larval form of an insect is treated with a compound of formula I, the development of the larvae is incomplete. The larvae die before moulting or are transformed into malformed larvae and do not, in general, develop into normal adult forms.

The insecticidal activity of the derivatives of formula I is best shown by a test on larvae of Dysdercus intermedius, Tenebrio molitor, Rhodnius prolixus, Leptinotarsa decemlineata, Hyalophora cecropia, Aedes aegypti, etc. An example of a test of insecticidal activity utilizing the larvae of Dysdercus intermedius is given hereafter.

The invention also relates to novel insecticidal compositions containing as the active ingredient at least one compound of formula I and containing possibly one or more other pesticidal agents. These compositions can be presented in the form of powders, granules, suspensions, emulsions, solutions for aerosols, lures or other preparations classically employed for insecticides. In addition to the active principle or active principles, these compositions generally contain a vehicle and/or a non-ionic surface-active agent, assuring, in addition, a uniform dispersion of the constitutive substances of the mixture. The vehicle utilized can be liquid such as water, alcohol, hydrocarbons, or other organic solvents, a mineral, animal or vegetable oil, or a powder such as talc, clays, silicates or kieselguhr.

An example of a specific insecticidal composition is an emulsifiable concentrate containing 0.1% by weight of the Z isomer of the S-oxide of 4-(4'-methyl-3'-hexenyl)-5,6-dihydro-2H-thiapyran, 5% of "Polysorbate 80," 94.8% of xylene and 0.1% of 2,4-dimethyl-6-tert.-butylphenol which can be utilized. These insecticidal compositions contain preferably from 0.001% to 2% of active material (compounds of formula I). They are prepared according to the methods usually utilized in this field.

The invention also relates to a process of preparation of derivatives of formula I comprising reacting 4-methyl-3-hexenol or a functional derivative thereof with a halogenation agent to obtain a 4-methyl-3-hexenyl halide of the formula:

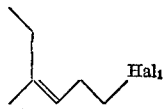

in which Hal$_1$ is bromine or chlorine, reacting the latter with magnesium or lithium to obtain a compound of the formula:

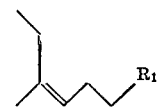

in which R$_1$ is lithium or Mg Hal$_1$, reacting the latter with thiacyclohexanone to obtain 4-(4'-methyl-3'-hexenyl)-4-hydroxytetrahydrothiapyran and treating the latter with a dehydrating agent to form 4-(4'-methyl-3'-hexenyl)-5,6-dihydro-2H-thiapyran which may be reacted with an oxidation agent to form the S-oxide of 4-(4'-methyl-3'-hexenyl)-5,6-dihydro-2H-thiapyran.

In preferred embodiments of the process, the halogenation agent utilized for the treatment of 4-methyl-3-hexenol or one of its functional derivatives is lithium bromide although it is also possible to use other halogenation agents such as sodium bromide, calcium bromide, the bromine triphenylphosphine complex, phosphorus oxychloride, thionyl chloride, etc. The functional derivative of 4-methyl-3-hexenol which is treated with a halogenation agent is preferably the p-toluene sulfonate of 4-methyl-3-hexenol.

The dehydration agent with which 4-(4'-methyl-3'-hexenyl)-4-hydroxy-tetrahydrothiapyran is treated is preferably phosphorus oxychloride but other dehydration agents such as thionyl chloride can also be used. This reaction is effected preferentially in the presence of a tertiary amine such as pyridine, collidine or a dialkylaniline. The oxidation agent reacted with 4-(4'-methyl-3'-hexenyl)-5,6-dihydro-2H-thiapyran is preferably hydrogen peroxide but sodium metaperiodate, potassium permanganate or a peracid such as m-chloroperbenzoic acid can be equally utilized.

In addition to their use as insecticides, the compounds of formula I are useful intermediates in the preparation of juvenile hormone as described in copending, commonly assigned U.S. patent application Ser. No. 275,104 filed on even date herewith.

For example, the S-oxide of 4-(4'-methyl-3'-hexenyl)-5,6-dihydro-2H-thiapyran of formula I can be condensed in the presence of a strong base with an alkyl 3-methyl-4-halogeno-2-butenoate of formula:

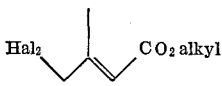

in which Hal₂ is chlorine or bromine and alkyl represents an alkyl having from 1 to 5 carbon atoms to obtain the S-oxide of alkyl β-methyl-γ-[4-(4'-methyl-3'-hexenyl)-5,6-dihydro-2H,2-thiapyranyl]-α-butenoate of the formula:

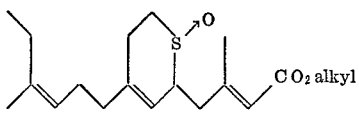

This compound is reacted with a reducing agent to form alkyl β-methyl-γ-[4-(4'-methyl-3'-hexenyl)-5,6-dihydro-2H,2-thiapyranyl]-α-butenoate of the formula:

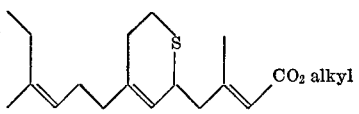

The alkyl is preferably methyl, ethyl, propyl, isopropyl, butyl, tert.-butyl or isobutyl. The compound of formula VI is then treated with a desulfurization agent to form the corresponding ester of the formula:

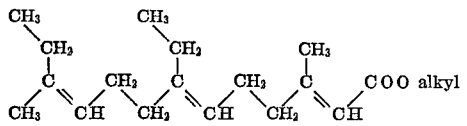

which are known intermediates for methyl 3,11-dimethyl-7-ethyl-10-epoxy-2,6-tridecadienoate or juvenile hormone and its analogs.

This process for the preparation of the compounds of formula VII is remarkable because it is entirely stereo-specific. For this, the geometrical configuration of the central double bond is set by inserting it in a cyclic system which subsequently is removed. The stereospecificity of the reactions of the process allows the obtaining solely of the desired stereo isomer while excluding all other stereo isomers.

It is equally possible to prepare alkyl β-methyl-γ-[4-(4'-methyl-3'-hexenyl)-5,6-dihydro-2H,2-thiapyranyl]-α-butenoate of formula VI without having recourse to the oxidation of the sulfur atom of 4-(4'-methyl-3'-hexenyl)-5,6-dihydro-2H-thiapyran and without the reduction of the S-oxide of alkyl β-methyl-γ-[4-(4'-methyl-3'-hexenyl)-5,6-dihydro-2H,2-thiapyranyl]-α-butenoate of formula V. This process is characterized in that 4-(4'-methyl-3'-hexenyl)-5,6-dihydro-2H-thiapyran is condensed with an alkyl 3-methyl-4-halogeno-2-butenoate of the formula:

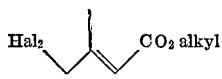

in which Hal₂ and alkyl have the above definitions in the presence of a strong base.

It is also possible to prepare methyl 3,11-dimethyl-7-ethyl 2,6,10-tridecatrienoate directly by treating S-oxide of alkyl β-methyl-γ-[4-(4'-methyl-3'-hexenyl)-5,6-dihydro-2H,2-thiapyranyl]-α-butenoate with a simultaneously reducing and desulfurization agent.

In a preferred embodiment of the process, the strong base in the presence of which the condensation of the S-oxide of 4-(4'-methyl-3'-hexenyl)-5,6-dihydro-2H-thiapyran with the alkyl 3-methyl-4-halogeno-2-butenoate of formula IV is effected is butyl lithium. The reaction is conducted in a solvent such as ethyl ether. In addition sodium hydride, sodium amide or sodium tert.-butylate can also be utilized as the strong base and tetrahydrofuran, dimethylformamide and dimethylsulfoxide can be utilized as the solvent. The reducing agent with which the S-oxide of alkyl β-methyl-γ-[4-(4'-methyl-3'-hexenyl) - 5,6 - dihydro-2H,2-thiapyran]-α-butenoate of formula V is treated is anhydrous stannous chloride in the presence of acetyl chloride, and the reaction is conducted in a mixture of solvents such as dimethylformamide and acetonitrile. It is also possible to utilize other reducing agents such as titanium trichloride.

The desulfurization agent for the treatment of the alkyl β-methyl-γ-[4-(4'-methyl-3' - hexenyl)-5,6-dihydro-2H,2-thiapyranyl]-α-butenoate of formula VI is preferably nickel treated by the method of Raney called W₂. Other types of Raney nickel such as W₄ and W₇ or other known desulfurization agents can be equally used.

The strong base in the presence of which an alkyl 3-methyl-4-halogeno-2-butenoate is condensed with 4-(4'-methyl-3'-hexenyl)-5,6-dihydro-2H-thiapyran is n-butyl lithium, but other strong bases such as alkali metal lower alkanolates, i.e., sodium methylate or alkali metal amides such as sodium amide can be utilized.

The agent for simultaneous reduction and desulfurization of the S-oxide of alkyl β-methyl-γ-[4-(4'-methyl-3'-hexenyl)-5,6-dihydro-2H,2 - thiapyranyl]-α-butenoate to form the corresponding alkyl 3,11-dimethyl-7-ethyl-2,6,10-tridecatrienoate is Raney nickel and preferably W₂ but other Raney nickels such as W₄ and W₇ may equally be used or any other appropriate agent.

In the following examples there are described several preferred embodiments to illustrate the invention. However, it should be understood that the invention is not intended to be limited to the specific embodiments.

EXAMPLE 1

4-(4'-methyl-3'-hexenyl)-5,6-dihydro-2H-thiapyran (isomer Z)

Step A: 4-methyl-3-hexenyl bromide (isomer Z).—158 gm. of p-toluene sulfonate of 4-methyl-3- hexenyl (isomer Z) [obtained by the process described by Corey et al., J. Am. Chem. Soc., 90, 5618 (1968)] were placed in suspension in 750 ml of acetone. The suspension was cooled to 10° to 15° C. and 150 gm of lithium bromide were added. The suspension was agitated for a period of 17 hours at room temperature, and then was poured into water. The aqueous suspension was extracted with benzene and the benzene phases were washed with water, dried over sodium sulfate, and the solvent distilled therefrom. Thereafter, the residue was rectified under vacuum to obtain 51 gm. of 4-methyl-3-hexenyl bromide (isomer Z) in the form of a colorless liquid boiling at 60° C. under 11 mm. of mercury and insoluble in water.

Analysis—C₇H₁₃Br; molecular weight=177.09. Calculated (percent): C, 47.48; H, 7.40; Br, 45.12. Found (percent): C, 47.1; H, 7.4; Br, 45.4

Step B: 4-(4'-methyl-3'-hexenyl)-4-hydroxy-tetrahydrothiapyran (isomer Z).—2 gm. of lithium were introduced into 50 ml. of ether and a solution of 23.2 gm. of 4-methyl-3-hexenyl bromide (isomer Z) in 200 ml. of ether were added thereto under an inert atmosphere. The mixture was agitated for 2½ hours and then was cooled to —15° C. under agitation and under an inert atmosphere. 13.5 gm. of thiacyclohexanone and 100 ml. of tetrahydrofuran were added and the mixture was agitated for a period of 10 minutes at 0° C. The reaction mixture was then poured into a saturated aqueous solution of ammonium chloride and iced. The organic phase was decanted and the aqueous phase extracted with methylene chloride. The organic phases were combined, washed with water, dried over sodium sulfate and evaporated to dryness. The residue was subjected to chromotography through silica with elution with a mixture of petroleum ether and ethyl acetate (8:2). After evaporation of the eluant, 9.1 gm. of 4-(4'-methyl-3'-hexenyl)-4-hydroxy-tetrahydrothiapyran (isomer Z) were obtained in the form of colorless crystals, which were soluble in most organic solvents and insoluble in water, and melted at about 40° C.

Analysis—$C_{12}H_{22}OS$; molecular weight=214.37. Calculated (percent): C, 67.24; H, 10.34; S, 14.95. Found (percent): C, 67.6; H, 10.3; S, 14.9.

I.R. Spectra (chloroform): Presence of OH.

Step C: 4-(4' - methyl-3' - hexenyl)-5,6 - dihydro - 2H-thiapyran (isomer Z).—16.5 gm. of 4-(4'-methyl-3'-hexenyl)-4-hydroxytetrahydrothiapyran (Z) and 170 ml. of pyridine were admixed and 24 ml. of phosphorus oxychloride cooled to 0° C. were added thereto. The mixture was agitated for 60 hours under an atmosphere of nitrogen and was then poured into a saturated aqueous solution of sodium bicarbonate and extracted with methylene chloride. The organic phases were washed with water, dried over sodium sulfate and evaporated to dryness. The pyridine was eliminated by distillation under a vacuum of 0.1 mm. of mercury to obtain 15.6 gm. of 4-(4'-methyl-3'-hexenyl)5,6-dihydro-2H-thiapyran (isomer Z). The compound occurred in the form of a colorless liquid soluble in ether and chloroform, slightly soluble in methanol and insoluble in water.

EXAMPLE 2

Step A: 4-methyl-3-hexene magnesium bromide.—18.5 gm. of magnesium were mixed with 100 ml. of ether and 12 gm. of 4-methyl-3-hexenyl bromide (isomer Z) were added thereto. Then a solution of 113 gm. of 4-methyl-3-hexenyl bromide (isomer Z) in 300 ml. of ether were added thereto while maintaining the temperature at 15° to 20° C. The reaction mixture was agitated for a period of 2 hours at 20° C. to obtain a solution of 4-methyl-3-hexene magnesium bromide testing 1.23 N.

Step B: 4-(4'-methyl-3'-hexenyl)-4-hydroxy-tetrahydrothiapyran (isomer Z).—80 ml. of the ethereal solution of the 4-methyl-3-hexene magnesium bromide of Step A were heated to reflux and a solution of 8.2 gm. of thiacyclohexanone in 130 ml. of ether were added thereto. The reaction mixture was agitated for 5 minutes at reflux and was then cooled to 20° C., and poured into a saturated aqueous solution of ammonium chloride. The aqueous mixture was extracted with ether and the ethereal phases were dried over sodium sulfate and evaporated to dryness. The residue was subjected to chromatography through silica with elution, with a mixture of petroleum ether, chloroform and ethyl acetate (50:50:25). After evaporation to dryness, 4.3 gm. of 4-(4'-methyl-3'-hexenyl)-4-hydroxy-tetrahydrothiapyran (isomer Z) were obtained, which product was identical to the product of Example 1, Step B.

EXAMPLE 3

S-oxide of 4-(4'-methyl-3'-hexenyl)-5,6-dihydro-2H-thiapyran (isomer Z)

6 gm. of 4-(4'-methyl-3'-hexenyl) - 5,6 - dihydro-2H-thiapyran (isomer Z) were cooled to 0° C. and after 14 ml. of hydrogen peroxide solution containing 110 volumes were added thereto, the mixture was brought to room temperature. Then the mixture was heated to 40° to 45° C. for one hour and the reaction mixture was next poured into a cooled aqueous solution of sodium acid sulfite and extracted with chloroform. The organic phase was dried over sodium sulfate and evaporated to dryness. The residue was subjected to chromatography through silica with elution with a mixture of benzene, chloroform and acetone (1:1:1). Evaporation of the eluant resulted in 4.35 gm. of the S-oxide of 4-(4'-methyl-3'-hexenyl)-5,6-dihydro-2H-thiapyran (isomer Z) in the form of a colorless liquid soluble in chloform and slightly soluble in water.

I.R. Spectra (chloroform): Presence of sulfoxide at 1036 cm.$^{-1}$.

EXAMPLE 4

Methyl 3,11-dimethyl-7-ethyl-2,6,10-tridecatrienoate (EEZ isomer)

Step A: S-oxide of methyl β-methyl-γ-[4-(4'-methyl-3'-(Z)-hexenyl) - 5,6 - dihydro-2H,2-thiapyranyl]-α-(E)-butenoate.—2.4 gm. of the S-oxide of 4-(4'-methyl-3'-hexenyl)-5,6-dihydro-2H-thiapyran (isomer Z) were subjected to a vacuum of 0.05 mm. of mercury at 40° C. for 30 minutes and thereafter 30 ml. of ether were added. The mixture was cooled to −40° C. and 9 ml. of a hexane solution of 1.6 N butyl-lithium and 20 ml. of ether were added under an atmosphere of nitrogen. After the mixture was agitated for 15 minutes at −40° C., 2.9 gm. of methyl 3-methyl-4-bromo-2-butenoate (isomer E) in 20 ml. of ether were added thereto, and the mixture was agitated for one hour at −40° C., then allowed to stand overnight at −60° C. The reaction mixture was next brought to 0° to +5° C. and poured into a saturated aqueous solution of iced ammonium chloride. The aqueous mixture was extracted with chloroform and the organic phases were washed with water, dried over sodium sulfate and evaporated to dryness. The residue was subjected to chromatography through silica with elution with a mixture of benzene, chloroform and acetone (1:1:1). Evaporation of the eluant resulted in 1 gm. of the S-oxide of methyl β-methyl-γ-[4-(4'-methyl - 3' - (Z)-hexenyl)-5,6-dihydro-2H,2-thiapyranyl] - α - (E)-butenoate in the form of a colorless liquid soluble in most of the usual organic solvents, and slightly soluble in water.

Step B: Methyl-β-methyl-γ-[4-(4'-methyl-3'-(Z)-hexenyl) - 5,6-dihydro-2H,2-thiapyranyl]-α-(E)-buteonate.— 1.8 gm. of the S-oxide of methyl β-methyl-γ-[4-(4'-methyl-3'-(Z)-hexenyl) - 5,6 - dihydro - 2H,2 - thiapyranyl]-α-(E)-butenoate were mixed with 10 ml. of dimethylformamide, 20 ml. of acetonitrile and 2.5 gm. of stannous chloride and the mixture was cooled to 0° to +5° C. 2 ml. of acetyl chloride and 10 ml. of acetonitrile were then added under nitrogen, and the reaction mixture was agitated for 15 minutes at 0° C. The reaction mixture was next poured into iced water and extracted with petroleum ether. The organic phases were washed with water, dried over sodium sulfate and evaporated to dryness to obtain 1.6 gm. of methyl β-methyl-γ-[4-(4'-methyl-3'-(Z)-hexenyl)-5,6-dihydro-2H,2-thiapyranyl]-α-butenoate in the form of colorless liquid soluble in most of the usual organic solvents and insoluble in water.

Analysis.—$C_{18}H_{28}O_2S$; molecular weight=308.49. Calculated (percent): C, 70.09; H, 9.15; S, 10.39. Found (percent): C, 70.4; H, 9.1; S, 10.6.

Step C: Methyl 3,11-dimethyl-7-ethyl-2,6,10-tridecatrienoate (isomer E.E.Z.).—A mixture of 278 mg. methyl β-methyl-γ-[4-(4'-methyl - 3' - (Z)-hexenyl)-5,6-dihydro-2H,2-thiapyranyl]-α-(E)-butenoate, 10 ml. of acetone and 10 ml. of an ethanolic suspension of $W_2$ Raney nickel were agitated for a period of 2 hours at room temperature, and then was filtered. The filter was washed with ethanol and the filtrates were combined and the solvents evaporated therefrom to obtain 200 mg. of a product which was purified by chromatography through a column of silica impregnated with silver nitrate (eluant: benzene-cyclohexane 8:2). The resulting methyl 3,11-dimethyl-7-ethyl-2,6,10-tridecatrienoate obtained was identical to that described by Rohler [J.A.C.S., vol. 89, p. 5293 (1967)].

EXAMPLE 5

A solution of 0.710 gm. of the S-oxide of 4-(4'-methyl-3'-hexenyl)-5,6-dihydro-2H-thiapyran (isomer Z) in 12 ml. of tetrahydrofuran was cooled to −50° C. under agitation and under nitrogen and then 0.55 ml. of lithium diisopropylamide followed by 2.5 ml. of a hexane solution of 1.6 N butyl lithium were added thereto. The reaction mixture was allowed to stand for 30 minutes at a temperature of −50° to −60° C. Thereafter 770 mg. of methyl 3-methyl-4-bromo-2-butenoate (isomer E) in 3 ml. of tetrahydrofuran were added thereto slowly. The mixture was agitated for one hour at −40° C. and allowed to stand overnight at −60° C. The reaction mixture was then brought to a temperature of 0 to +5° C. and poured into a saturated aqueous solution of iced ammonium chloride. The aqueous mixture was extracted with chloroform and the organic phases were washed with water, dried over sodium sulfate and evaporated to dryness under reduced pressure. The residue was subjected to chromatography through silica with elution with a mixture of benzene, chloroform and acetone (1:1:1) and evaporation of the eluant gave 650 mg. of the S-oxide of methyl β-methyl-γ-[4-(4′-methyl-3′-(Z)-hexenyl)-5,6-dihydro-2H,2-thiapyranyl]-α-(E)-butenoate.

EXAMPLE 6

2.5 gm. of 4-(4′-methyl-3′-hexenyl)-5,6-dihydro-2H-thiapyran (isomer Z) were subjected to a vacuum of 0.05 mm. of mercury for 30 minutes and then 30 ml. of anhydrous ethyl ether were added, and the mixture was cooled to −20° C. 9 ml. of 1.6 N butyl lithium in hexane solution, then 20 ml. of anhydrous ethyl ether were added thereto dropwise under agitation and under an atmosphere of nitrogen. Then the agitation was continued at −20° C. for 15 minutes and thereafter 2.9 gm. of methyl 3-methyl-4-bromo-2-butenoate (isomer E) and 20 ml. of anhydrous ethyl ether were added thereto. The reaction mixture was agitated for one hour at −20° C. then allowed to stand overnight at −60° C. Next, the temperature was allowed to return to about 0° C. and the reaction mixture was poured into a saturated aqueous solution of iced ammonium chloride. The aqueous mixture was extracted with chloroform and the organic phases were washed with water, dried over sodium sulfate and evaporated to dryness under reduced pressure to obtain methyl β-methyl-γ-[4-(4′-methyl-3′-(Z)-hexenyl)-5,6-dihydro-2H,2-thiapyranyl]-α-(E)-butenoate.

EXAMPLE 7

A mixture of 830 mg. of methyl β-methyl-γ-[4-(4′-methyl-3′-(Z)-hexenyl)-5,6-dihydro - 2H,2 - thiapyranyl]-α-(E)-butenoate, 12 ml. of dimethyl sulfoxide on siliporite and 8 ml. of an ethanolic suspension of Raney nickel $W_2$ were agitated for one hour at room temperature. Then the mixture was diluted with 50 ml. of benzene, filtered, and the filter was washed with benzene. The filtrate was evaporated under reduced pressure and the residue was poured into water. The aqueous phase was extracted with petroleum ether (35° to 70° C.).

The organic phases were washed with water, dried over sodium sulfate and evaporated to dryness under reduced pressure. The residue of 620 mg. was purified by chromatography to obtain methyl 3,11-dimethyl-7-ethyl-2,6,10-tridecatrienoate (isomer EEZ). By operating in the same manner, but utilizing diethyl sulfoxide in place of dimethyl sulfoxide, analogous results were obtained.

Methyl 3,11-dimethyl - 7 - ethyl-2,6,10-tridecatrienoate (isomer E.E.Z) was also obtained starting from the S-oxide of methyl β-methyl-γ-[4-(4′-methyl-3′-(Z)-hexenyl)-5,6-dihydro-2H,2 - thiapyranyl]-α-(E)-butenoate in the following manner:

10 ml. of a suspension of Raney nickel $W_2$ in ethanol were added to a solution of 309.5 mg. of the S-oxide of methyl β-methyl-γ-[4-(4′-methyl-3′-(Z)-hexenyl)-5,6-dihydro-2H,2-thiapyranyl]-α-(E)-butenoate in 10 ml. of acetone. The reaction mixture was agitated for two hours at 20° to 25° C. and then was filtered to eliminate the nickel. The filter was washed abundantly with ethanol and combined filtrates were evaporated under reduced pressure to obtain 200 mg. of the E.E.Z. isomer of methyl 3,11-dimethyl-7-ethyl-2,6,10-tridecatrienoate.

Study of Insecticidal Properties

The test was effected on larvae of *Dysdercus intermedius* at the last stage of their development. An acetone solution containing 20 gm. per liter was applied topically on the abdominal tergites of larvae in an amount of 5 microliters, being $100 \times 10^{-6}$ gm. of the compound to be tested per insect. Ten insects per dose were utilized. Thereafter the larvae were examined daily after the treatment. The examination determined the stage attained by the larvae, and allowed a determination of values from 0 to 5. The value 5 corresponded to the obtention of a giant larva not having transformed into an adult. The intermediate values are applied to individuals having molted more or less completely, but having been brought to more or less abnormal forms. The tests are effected in parallel with control larvae which undergo no treatment.

The following table gives the experimental results obtained with the S-oxide of 4-(4′-methyl-3′-hexenyl)-5,6-dihydro-2H-thiapyran.

TABLE

| | Doses in µg. | Individual number | Molting day | Observations | Notes |
|---|---|---|---|---|---|
| Test compound | 100 | 1 | 9th | Giant larva | 5 |
| | | 2 | 8th | do | 5 |
| | | 3 | 9th | do | 5 |
| | | 4 | 9th | do | 5 |
| | | 5 | 10th | do | 5 |
| | | 6 | 8th | do | 5 |
| | | 7 | 9th | do | 5 |
| | | 8 | 9th | do | 5 |
| | | 9 | | Dead | |
| | | 10 | 8th | Giant larva | 5 |
| Controls | 0 | 1 | 13th | Normal female | 0 |
| | | 2 | 13th | do | 0 |
| | | 3 | 13th | Normal male | 0 |
| | | 4 | 13th | Normal female | 0 |
| | | 5 | 13th | Normal male | 0 |
| | | 6 | 13th | Normal female | 0 |
| | | 7 | 13th | do | 0 |
| | | 8 | 10th | do | 0 |
| | | 9 | 13th | do | 0 |
| | | 10 | 13th | do | 0 |

The results of the foregoing Table show that the tested S-oxide under the test conditions is endowed with a good activity since out of 10 treated larvae, 9 became giant larvae and the 10th died.

Various modifications of the products and processes of the invention may be made without departing from the spirit or scope thereof and it is to be understood that the invention is to be limited only as defined in the appended claims.

We claim:
1. A 2H-thiapyran of the formula

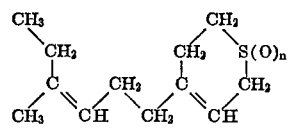

wherein $n$ is 0 or 1.

2. The Z isomer form of the compounds of claim 1.

References Cited

Onesta et al.: Chem. Abs. 54: 22618–9 (1960).

Roberts et al.: Basic Principles of Org. Chem. (Benjamin, N.Y., 1965), pp. 345–7, 391–4.

Fieser et al.: Advanced Org. Chem. (Reinhold, N.Y., 1961), pp. 142, 313.

Cram et al.: Org. Chem. (McGraw-Hill, N.Y., 1964), p. 259.

NATALIE TROUSOF, Primary Examiner

C. M. S. JAISLE, Assistant Examiner

U.S. Cl. X.R.

260—405.5; 424—275, 312